United States Patent Office 2,970,164
Patented Jan. 31, 1961

2,970,164

PREPARATION OF ESTERS BY PARTIAL OXIDATION OF PETROLEUM FRACTIONS

James L. Jezl, Swarthmore, Pa., assignor to Sun Oil Company, Philadelphia, Pa., a corporation of New Jersey No Drawing. Filed Sept. 7, 1956, Ser. No. 608,441

15 Claims. (Cl. 260—451)

This invention relates to the preparation of carboxyl compounds by partial oxidation of hydrocarbons, and more particularly to an improved manner of partial oxidation, whereby desirable oxidation products such as esters are obtained in increased yields.

It is known in the art to partially oxidize various hydrocarbon materials to produce carboxyl compounds. A difficulty in such oxidation is the obtaining of satisfactory yields of the desired carboxyl compounds, and the suppression of formation of undesired oxidation products.

For example, in the oxidation of petroleum fractions, e.g. those containing primarily aliphatic and naphthene compounds, to produce aliphatic and naphthenic carboxyl compounds, a wide variety of types of oxidation products is generally obtained, the products including aldehydes, ketones, hydroxy acids, lactones, etc., in addition to the desired carboxyl compounds such as carboxylic acids and esters. The present invention provides a novel manner of obtaining increased yields of the desired carboxyl compounds in such oxidations.

In oxidations as described in the preceding paragraph, it is frequently desired to produce polycarboxyl compounds. It is often difficult however to produce such compounds in satisfactory yields. Apparently, after a single carboxyl group has been formed in a molecule of the oxidation charge, further reaction of the carboxyl compound tends to involve decomposition of the carboxyl group, rather than introduction of a second carboxyl group into the molecule. The present invention provides a novel manner whereby polycarboxyl compounds can be obtained in satisfactory yields.

The invention also provides a novel manner of producing polyester resinous condensation products of polycarboxyl compounds with polyhydric alcohols. According to the invention, this is accomplished by reacting a polyhydric alcohol, containing two or more hydroxyl groups per molecule, with polycarboxyl compounds, containing two or more carboxyl groups per molecule, produced in situ in partial oxidation of hydrocarbons.

The process according to the invention involves partial oxidation of hydrocarbons in the presence of an added ester-forming hydroxyl organic compound, whereby esters are formed by reaction of the hydroxyl compound with carboxylic acids formed in situ by oxidation of the compounds containing acyclic carbon atoms. The formation of esters, which results from the presence of the added hydroxyl compound during the oxidation, results in a higher yield of desired carboxyl compounds and in suppression of formation of undesired oxidation products.

The hydrocarbon charge to the oxidation can be a single hydrocarbon, e.g. an aliphatic compound. Alternatively, the oxidation charge may contain a mixture of hydrocarbons, e.g. a wide boiling range mixture of aliphatic and naphthenic hydrocarbons as contained in petroleum fractions, etc.

The process according to the invention provides superior results to those obtainable by oxidizing a hydrocarbon charge in the absence of an added hydroxyl compound and then esterifying the carboxyl oxidation products with a hydroxyl compound. The presence of the hydroxyl compound during the oxidation is an essential feature of the process according to the invention.

An oxidation catalyst can be employed if desired in the partial oxidation. However, the use of such catalyst is not an essential feature of the invention. Where a catalyst is used, it is preferably of the drier type, e.g. cobalt naphthenate, cobalt stearate, cobalt oleate, manganese oleate, manganese salts of carboxylic acids produced by partial oxidation of hydrocarbons, etc.

The oxidation products obtained in the process according to the invention sometimes comprise two layers, one containing the excess hydroxyl compound, and the other containing the bulk of the oxidation products and of the unoxidized hydrocarbon if any. Preferably, the layers are maintained in intimate admixture by suitable agitation during the oxidation. Upon conclusion of the oxidation, the layers can be separated and worked up separately according to procedure as described subsequently, or the layers can be worked up together.

The oxidation product layer generally contains some unoxidized hydrocarbons, carboxylic acid products of oxidation, and esters formed by reaction of such carboxylic acids with the added hydroxyl compound. In cases where the added hydroxyl compound is a polyhydric compound, i.e. contains two or more hydroxyls per molecule, the oxidation product layer generally contains substantial amounts of resinous condensation products produced by reaction of the hydroxyl compound with polycarboxylic acids formed during the oxidation.

In working up the oxidation product layer, the oxygen-containing compounds can be separated from the unoxidized hydrocarbons by selectively dissolving those compounds in a polar solvent such as alcohol, ether, furfural, acetone, etc. Carboxylic acids can then be separated from the other oxygen-containing compounds by washing the mixture at room temperature with a dilute aqueous solution of an alkali such as sodium carbonate or sodium hydroxide. The dilute alkali reacts with the acids to form salts or soaps, but does not react substantially with the ester. Any suitable conditions for reaction of alkali selectively with carboxylic acids in the presence of esters can be employed.

Alternatively, the mixture of acids and esters can be contacted with additional hydroxyl compound under esterification conditions to produce esters of the acids and transesterification products of the esters, the product being a mixture of such new esters, transesterification products and esters originally present in the oxidation product layer. The hydroxyl compound used in such esterification can be the same compound as that used in the oxidation, or it can be a different compound.

In the case where the oxidation product layer contains polyesters as well as monomeric esters, the latter can be separated from the polyesters by distillation under vacuum to leave the polyesters as residue, or by other suitable means.

Alternatively, the esters in the oxidation product layer, including polyesters if any, can be hydrolyzed, e.g. by saponification, to liberate the hydroxyl compound and the carboxyl component, the latter being obtained in the form of a soap or salt when the hydrolysis is performed by saponification. Such soaps or salts can then be acidified with aqueous sulfuric acid for example, and the resulting carboxylic acids separated from the hydroxyl compound. Such soaps or salts can also be separated from the hydroxyl compound by salting out from an aqueous solution, the hydroxyl compound being salted out first, and the soaps or salts subsequently.

The hydroxyl compound layer usually contains, in addition to excess hydroxyl compound, some of the esters formed in the oxidation, there being a distribution of such esters between the two layers; the bulk of the esters however is in the oxidation product layer. The hydroxyl compound layer may also contain resinous polyesters in the case where a polyhydric compound was used as the added hydroxyl compound. The hydroxyl compound layer is generally substantially free of carboxylic acids, substantially all of such acids being in the oxidation product layer.

The hydroxyl compound layer can be worked up by first separating the hydroxyl compound from the oxidation products by selectively dissolving the hydroxyl compound in a polar solvent such as alcohol, ether, furfural, acetone, etc. In suitable cases, the ester can if desired be separated from resinous polyester by vacuum distillation. Alternatively, the esters can be saponified to produce soaps or salts of the carboxylic acids, and otherwise treated according to the same procedure as described with reference to the oxidation product layer.

If desired, similar operations performed on the two layers can be carried out in a single operation upon a mixture of the two layers. However, it is generally preferable to separate the layers and work them up separately.

Monobasic acids can be separated if desired from polybasic acids by selective extraction of the latter by means of a polar solvent, or by fractional distillation or fractional crystallization or any other suitable known manner for separating monobasic acids from dibasic acids.

Monobasic acids produced according to the invention can be used in the preparation of alkali metal soaps or salts for use as emulsifiers, in the preparation of salts with heavy metals, e.g. manganese, copper, cobalt, etc., for use as driers in the paint industry, in the preparation of salts of amines, e.g. N-octadecyl trimethylene diamine, petroleum naphthenyl monoamines, for use in the protection of various metal surfaces from corrosion, e.g. by oil well fluids or other corrosive materials.

Polybasic acids produced according to the process of the invention are useful in the preparation of esters, e.g. with 2-ethylhexyl alcohol, for use as plasticizers for rubber or plastics, e.g. polyvinyl chloride; in the preparation of polyester or polyamide resins, etc.

Esters produced according to the present invention are useful as plasticizers for rubber and synthetic resins such as polyvinyl chloride, etc.; or as additives for petroleum fractions, e.g. lubricating oil fractions, to increase the lubricity of the oil, etc.

Resinous condensation products produced according to the invention are useful in various applications. The resins produced in oxidation of aliphatic hydrocarbons are useful in such applications as tubing, coatings, adhesives, binders, etc.

The hydroxyl compound employed according to the invention is preferably added to the oxidation charge as a material containing a major proportion of organic hydroxyl compounds, and preferably consisting essentially of such compounds. Examples of suitable hydroxyl compounds are alkanols such as methanol, n-butanol, isobutanol, octyl alcohols, dodecyl alcohols, octadecyl alcohols, etc.; glycols such as ethylene glycol, tetramethylene glycol, hexamethylene glycol, diethylene glycol, triethylene glycol, etc.; monoethers of polyethylene glycols such as butyl monoether of ethylene glycol, butyl monoether of diethylene glycol, etc.; alkanol amines such as ethanol amine, diethanol amine, diethyl ethanol amine, triethanol amine, etc.; glycerol; 1,2,5-pentanetriol; pentaerythritol; sorbitol; mannitol; 1,2-hydroxy cyclohexane; benzyl alcohol; inositol; etc. The hydroxyl compound preferably has 1 to 20 carbon atoms, and more preferably 1 to 6 carbon atoms. Acyclic hydroxyl compounds are preferred. Mixtures of hydroxyl compounds can be employed.

The partial oxidation according to the invention is carried out with the oxidation charge in liquid phase. A free-oxygen containing gas is employed as the oxidizing agent, e.g. oxygen, air, ozonized air, etc. The partial oxidation is preferably carried out at a temperature within the approximate range from 200° F. to 400° F., more preferably 230° F. to 350° F. The pressure in the oxidation can be atmospheric pressure or elevated pressure preferably not exceeding 400 p.s.i.g. The conditions of temperature and pressure should be such that the added hydroxyl compound is in liquid phase.

The oxidation is performed in liquid phase in order, among other reasons, to avoid the excessive oxidation of hydroxyl compound which would take place in a vapor phase oxidation, such oxidation tending to eliminate the desired esterification action according to the invention. Preferably, relatively low temperatures are employed in the oxidation in order to further inhibit oxidation of the added hydroxyl compound. The oxidation according to the invention is performed under conditions which do not favor the oxidation of the added hydroxyl compound.

Examples of suitable hydrocarbon oxidation charges are petroleum fractions such as lubricating oil, wax, foots oil, kerosene, gas oil fractions, etc.

The process according to the invention provides large yields of esters, even in the absence of a catalyst specially added as an esterification catalyst. However, if desired a catalyst specially designed for esterification activity can be employed. Such catalyst can be separate from the oxidation catalyst employed. Thus for example silica gel can be employed as esterification catalyst in addition to a catalyst such as manganese naphthenate, used as oxidation catalyst. Alternatively, a single catalyst can be employed with has both oxidation activity and esterification activity.

The relative proportions of hydroxyl compound and hydrocarbon charge vary depending on the amount of carboxylic acids formed in the oxidation, the desired extent of esterification, etc. Preferably, the amount of hydroxyl compound is within the approximate range from 1 to 100 volume percent based on hydrocarbon charge, more preferably 5 to 50 volume percent.

The following examples illustrate the invention:

*Example I*

A petroleum foots oil was partially oxidized by oxygen at 280° F. and atmospheric pressure in the presence of a manganese naphthenate catalyst. In one run, the oxidation was conducted in the presence of 10 volume percent of glycerol based on foots oil, and in another run the oxidation was conducted in the absence of glycerol.

The foots oil charge had been obtained as filtrate in the filtration of a solution, in a methyl ethyl ketone dewaxing solvent, of slack wax obtained from a furfural refined lubricating oil. Typically, such filtration is carried out at 30° F. to produce a filtrate having the following typical properties: cloud point 70° F., specific gravity at 20° C. 0.8552, refractive index at 20° C. 1.4727, viscosity at 100° F. 32.7 centistokes, viscosity at 210° F. 5.62 centistokes, viscosity index 122, average molecular weight 436, boiling range at 2 mm. of Hg absolute, 335° F. to 569° F., boiling range at atmospheric pressure (calculated), 665° F. to 935° F., concentration of compounds containing one or more aromatic rings per molecule, about 10 weight percent. Typically, about 40 percent of the foots oil is low melting (below 100° F.) wax crystallizable from methyl ethyl ketone solution at 0° F.

50 ml. of foots oil were employed as oxidation charge, and manganese naphthenate was added in amount sufficient to provide 0.05 weight percent of manganese based on charge. Substantially pure oxygen was bubbled through the charge at a rate of 435 ml. at standard conditions per minute. The oxidation was continued for 24 hours, at the end of which time the reaction mixture comprised an upper, oxidized hydrocarbon layer and a lower glycerol layer. The upper layer was greatly increased in viscosity over the hydrocarbon charge, and resembled a clear, thick syrup at room temperature. The glycerol layer apparently contained resinous condensation products of glycerol and polybasic acids produced in the oxidation, and was found to be susceptible to molding at elevated temperature to produce solid molded plastic materials.

The following table shows the properties of the oxidation products obtained in the respective runs:

| Percent Glycerol Present | Sap. No. | Acid No. | Sap/Acid Ratio |
| --- | --- | --- | --- |
| 0 | 130.7 | 40.0 | 3.3 |
| 10 | 150.5 | 30.5 | 4.9 |

Saponification and acid numbers are expressed in mg. of KOH per gram.

The increased ratio of saponification number to acid number, in the case where glycerol was present, indicates that ester formation was promoted by the presence of glycerol. The increased saponification number in the case where glycerol was present indicates that formation of carboxyl-containing compounds was promoted by the presence of glycerol.

This example shows that the presence of glycerol provides improved results in partial oxidation of petroleum hydrocarbons, in that more carboxyl compounds and more esters are formed, and in that formation of polycarboxyl compounds is promoted. The invention provides more effective oxidation than that obtainable under otherwise similar conditions with either the hydrocarbon charge or the added hydroxyl compound separately.

*Example II*

Runs similar to those described in Example I were performed using mannitol and ethylene glycol in place of glycerol. 5 grams of mannitol per 50 ml. of foots oil, and 5 ml. of ethylene glycol per 50 ml. of foots oil, were used. The following table shows the results obtained, as compared with the run in which no hydroxyl-containing additive was employed:

| Hydroxyl Compound | Sap. No. | Acid No. | Sap/Acid Ratio |
| --- | --- | --- | --- |
| None | 130.7 | 40.0 | 3.3 |
| Mannitol | 141.0 | 39.2 | 3.6 |
| Glycol | 169.0 | 17.3 | 9.8 |

The oxidation products obtained with mannitol and ethylene glycol were generally similar with regard to layer formation, appearance and properties to those obtained with glycerol in Example I, except that the hydroxyl compound layer, in the case of glycol, was a thick, tacky syrupy material, and in the case of mannitol a solid, friable material at room temperature.

This example shows that mannitol and glycol are each effective to produce increased carboxyl compound, ester and polycarboxyl compound formation. Glycol appears to be most effective in this regard of the three compounds tested in Examples I and II, with glycerol the next most effective. Generally, it is preferred that the hydroxyl compound employed according to the invention should have less than 4 carbon atoms, and more preferably less than 3 carbon atoms.

Generally similar results to those obtained in Examples I and II are obtained in other oxidations of hydrocarbon charge stocks, e.g. petroleum white oil, paraffin wax, micro-crystalline wax, etc., in the presence of other hydroxyl compounds, e.g. methanol, n-octyl alcohol, tetramethylene glycol, butyl monoether of ethylene glycol, sorbitol, etc. When monohydric alcohols such as methanol, isopropanol, n-butanol, etc. are employed, formation of resinous condensation products does not occur, except to the slight extent that monohydric alcohols may be oxidized during the oxidation to polyhydric alcohols condensible with polybasic acids to form such products.

*Example III*

Saturated hydrocarbons obtained from a deasphalted and dewaxed petroleum residue were partially oxidized at 280° F. in the absence of an added metallic oxidation catalyst. The residue from which the saturated hydrocarbons were obtained had A.P.I. gravity of 26.3, Saybolt Universal viscosity at 210° F. of 153.9 seconds, initial boiling point of about 900° F., viscosity index of 95, refractive index at 20° C. of 1.4899, and aromatic hydrocarbon content of about 27.5 weight percent. Aromatic hydrocarbons were removed from the residue by selective adsorption on silica gel and Attapulgus clay, used as adsorbents in series, to obtain a saturated hydrocarbon fraction containing about 5 percent aromatics and having refractive index of 1.4917 and average molecular weight of about 700.

In one run, 10 percent of glycerol based on charge was present; in another run, glycerol was absent. After 24 hours, the following properties were exhibited by the product obtained without glycerol and the oxidized oil layer of the product obtained with glycerol.

| Product | Sap. No. | Acid No. | Sap/Acid Ratio |
| --- | --- | --- | --- |
| No glycerol | 1.8 | 0.34 | 5.3 |
| 10% glycerol | 26 | 6.1 | 4.3 |

These results indicate that glycerol promotes oxidation and provides a satisfactory rate of oxidation even in the absence of a conventional oxidation catalyst.

The glycerol layer in the oxidation with glycerol had saponification number of 48 and acid number of 0.05, indicating that esters formed by reaction of glycerol with acids formed in the oxidation dissolved to a substantial extent in the glycerol layer. This fact causes the ratio of saponification number to acid number for the aggregate of the two layers to be higher than the 4.3 indicated for the oxidized oil layer.

The invention claimed is:

1. Process for partially oxidizing saturated aliphatic and naphthenic hydrocarbons which comprises contacting a petroleum fraction selected from the group consisting of wax and of oil from which aromatic hydrocarbons have been removed, in liquid phase with free-oxygen containing gas at a temperature in the approximate range from 200 to 400° F. and a pressure not greater than about 400 p.s.i.g. in the presence of 5 to 50 volume percent based on liquid hydrocarbon of an added aliphatic polyhydric alcohol thereby to increase the rate of saponification number increase over that obtained in the absence of the hydroxyl compound.

2. Process for partially oxidizing saturated aliphatic and naphthenic hydrocarbons which comprises contacting a mixture of petroleum lubricating oil and wax boiling in the range from 335° F. to 569° F. at 2 mm. of Hg, in liquid phase with free oxygen-containing gas at a temperature within the approximate range from 200° F. to 400° F. and a pressure not substantially greater than 400 p.s.i.g. in the presence of 5 to 50 volume percent based on liquid hydrocarbon of an added aliphatic polyhydric alcohol thereby to increase the rate of saponification number increase over that obtained in the absence of the hydroxyl compound.

3. Process according to claim 2 wherein a metallic oxidation catalyst is present in the contacting.

4. Process according to claim 2 wherein the polyhydric alcohol is glycerol.

5. Process according to claim 2 wherein the polyhydric alcohol is mannitol.

6. Process according to claim 2 wherein the polyhydric alcohol is ethylene glycol.

7. Process according to claim 2 wherein a lower layer containing a moldable polymer is separated from an upper layer of the products of the contacting.

8. Process for partially oxidizing saturated aliphatic and naphthenic hydrocarbons which comprises contacting a deasphalted and dewaxed petroleum residue from which aromatic hydrocarbons have been removed, in liquid phase with free-oxygen containing gas at a temperature from 200 to 400° F. and a pressure not substantially greater than 400 p.s.i.g. in the presence of 5 to 50 volume percent based on liquid hydrocarbon of an added aliphatic polyhydric alcohol thereby to increase the rate of saponification number increase over that obtained in the absence of the hydroxyl compound.

9. Process according to claim 8 wherein the polyhydric alcohol is glycerol.

10. Process according to claim 1 wherein the products of said contacting are contacted with a solvent to separate hydrocarbons from oxygen-containing compounds.

11. Process according to claim 10 wherein the oxygen-containing compounds are contacted with dilute aqueous alkali to react with unesterified carboxylic acids, and the reaction products are separated from the esters.

12. Process according to claim 1 wherein a mixture of esters and unesterified acids in the products of said contacting are contacted with an ester-forming organic hydroxyl compound under esterification conditions.

13. Process according to claim 1 wherein esters in the products of said contacting are hydrolyzed to produce unesterified carboxyl compounds, and the latter are separated from hydroxyl compound produced in the hydrolysis.

14. Process according to claim 1 wherein the products of said contacting are separated into a hydroxyl compound layer and an oxidized hydrocarbon layer.

15. Process according to claim 14 wherein the hydroxyl compound layer is contacted with a solvent to selectively dissolve excess hydroxyl compound and to leave hydrocarbons and oxygen-containing products of oxidation undissolved.

References Cited in the file of this patent

UNITED STATES PATENTS

| | | |
|---|---|---|
| 2,653,165 | Levine | Sept. 22, 1953 |
| 2,729,665 | Buckman | Jan. 3, 1956 |
| 2,766,272 | Hetzel | Oct. 9, 1956 |
| 2,879,289 | Johnson | Mar. 24, 1959 |

FOREIGN PATENTS

| | | |
|---|---|---|
| 623,836 | Great Britain | May 24, 1949 |

OTHER REFERENCES

Chernozhukov et al., Foreign Petroleum Technology, vol. 3, #12, 1935, pp. 577–594.